Jan. 24, 1967   M. BITZER   3,299,723
INTERMITTENT DWELL WINDSHIELD WIPER SYSTEM
Filed June 24, 1964

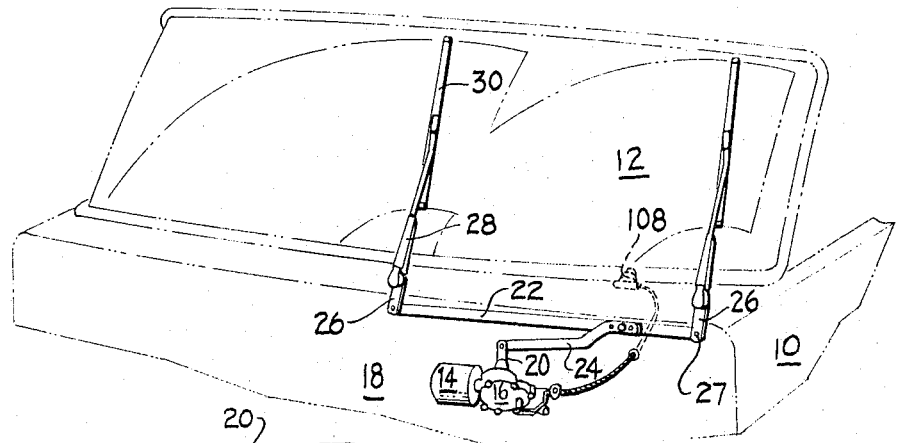
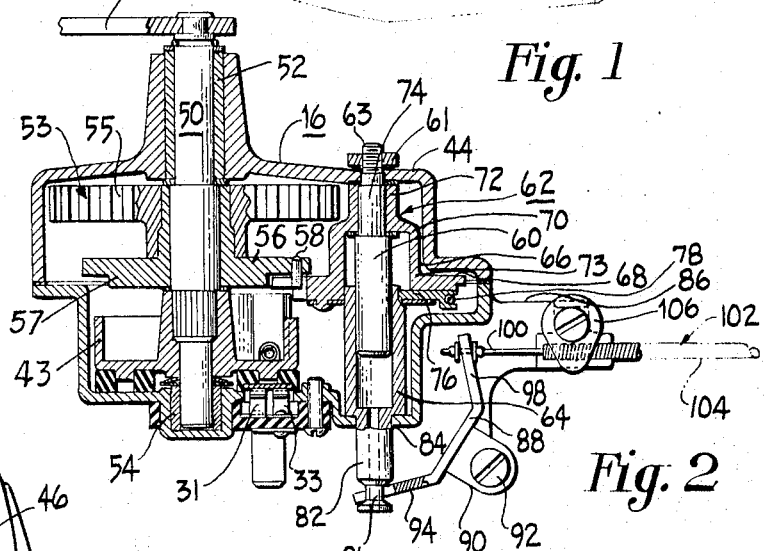
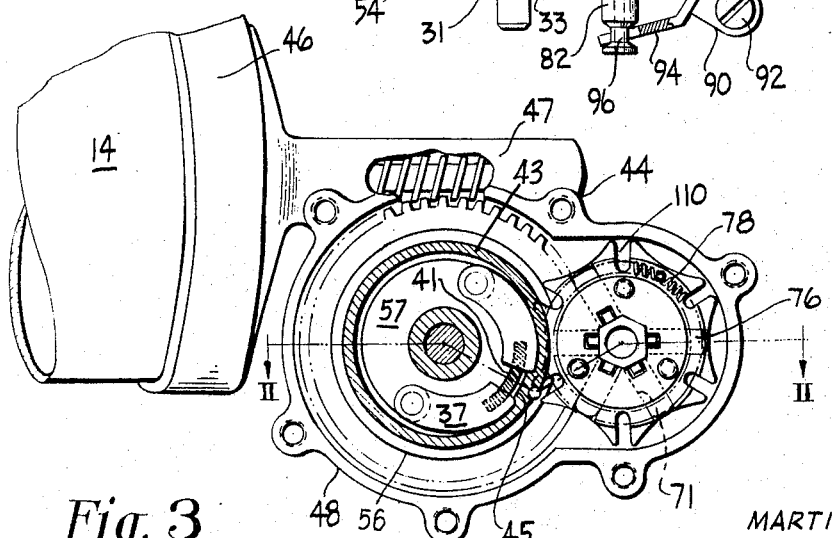
Fig. 1
Fig. 2
Fig. 3
INVENTOR.
MARTIN BITZER
BY E. Herbert Liss
ATTORNEY.

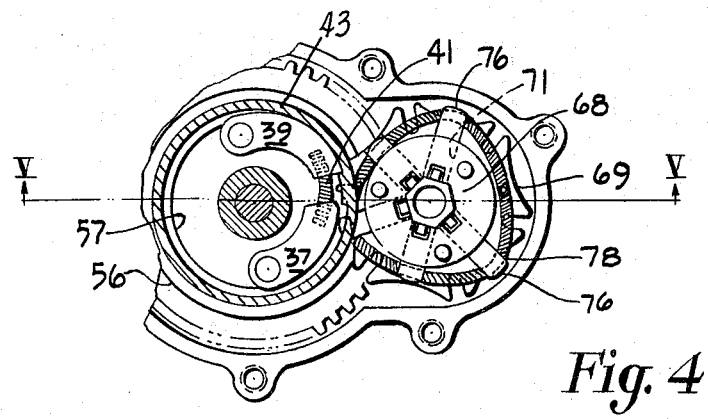
Fig. 4
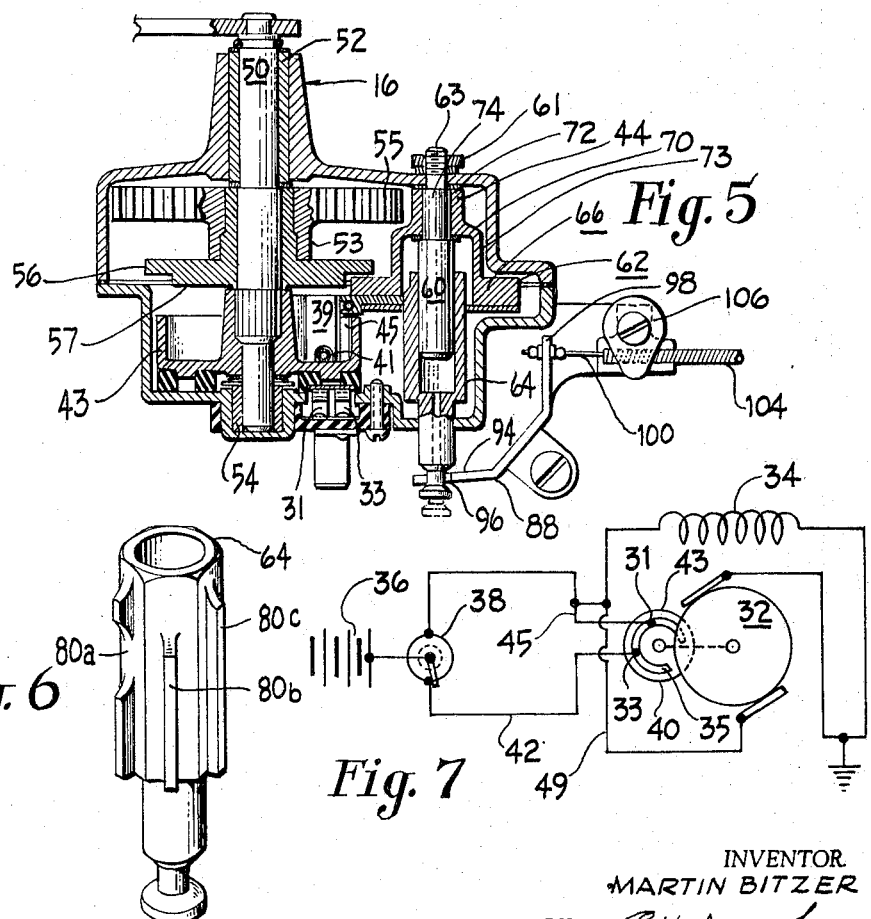
Fig. 5
Fig. 6
Fig. 7
INVENTOR.
MARTIN BITZER
BY E. Herbert Liss
ATTORNEY.

INVENTOR.
MARTIN BITZER
BY E. Herbert Liss
ATTORNEY.

United States Patent Office 3,299,723
Patented Jan. 24, 1967

---

3,299,723
INTERMITTENT DWELL WINDSHIELD WIPER SYSTEM
Martin Bitzer, Kenmore, N.Y., assignor to Trico Products Corporation, Buffalo, N.Y.
Filed June 24, 1964, Ser. No. 377,596
5 Claims. (Cl. 74—125.5)

The present invention relates to improvements in motor construction of the intermittent dwell type and, more particularly, to a wiper motor power transmission assembly for providing intermittent oscillatory wiper motion with operator controllable durations of dwell.

An improved, simplified, intermittent dwell windshield wiper system is provided which may be built into the gear box of a rotary windshield wiper. With this system, oscillatory wiper motion having operator selectable dwell period duration between cycles of wiper operation is produced by mechanical means. The simplicity of the structure results in economy while maintaining reliability of performance and providing selectivity of operating frequency.

The primary object of the present invention is to provide an improved mechanical intermittent dwell power transmission assembly with selectivity of operating frequency which is of simple and economical construction.

Another object of the invention is to provide an improved intermittent dwell mechanical movement in a windshield wiper system by means of which operator controlled selectivity of wiping frequency is provided for the selection of the duration of the dwell periods.

Other objects and advantages of the invention will be apparent from the following detailed description taken in connection with the accompanying drawings in which:

FIG. 1 is a partial perspective view of an automotive vehicle incorporating the invention;

FIG. 2 is a sectional view of a gear box taken on line II—II of FIG. 3;

FIG. 3 is an elevational view of the gear box shown in FIG. 2 with the cover removed and the worm gear housing broken away;

FIG. 4 is a partial elevational view of the power transmission assembly similar to FIG. 3 showing a different position;

FIG. 5 is a sectional view taken on line V—V of FIG. 4;

FIG. 6 is a perspective view of the dwell period selector for controlling the duration of the dwell period;

FIG. 7 is a circuit diagram of the wiper motor of this invention;

Figure 8:
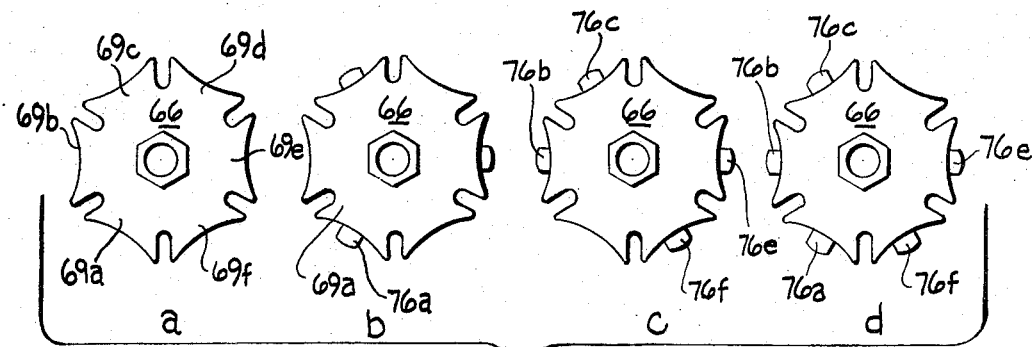
FIG. 8 is a schematic view of the Geneva gear utilized in this invention showing the extendable fingers in different positions for obtaining dwell periods of different durations.

Briefly, the invention comprises a gear box including a housing having a worm wheel assembly rotatable therein adapted to be driven by a worm gear on the output shaft of a rotary motor. The worm wheel assembly is mounted for independent rotation concentric with the output shaft of the power transmission assembly. It includes a worm wheel and a clutch shoe eccentrically mounted with respect to the axis of the worm wheel for pivotal movement relative to the worm wheel, but rotatable therewith. The clutch shoe is biased outward into engagement with a clutch member secured to the output shaft for rotation therewith. The worm wheel assembly also includes a lug rigidly mounted on the worm wheel for actuating the Geneva gear or wheel to move it through one lobe for each revolution of the worm wheel. The Geneva wheel has mounted thereon radially extendable fingers which are biased radially inward and may be projected radially outward upon operator controlled movement of an axially movable cam mechanism. The axially movable cam mechanism or dwell period selector is designed to cause selected combinations of fingers to move radially outward with each degree of movement thereof. When a lobe having an outwardly extended radial finger is rotated to a position where it engages the clutch member on the worm wheel assembly, the clutch member on the worm wheel assembly is disengaged from the clutch member on the output shaft and rotation of the output shaft ceases until a lobe of the Geneva wheel or gear which has no outwardly extending radial finger is rotated to a position adjacent the clutch shoe which is mounted on the worm wheel assembly. The position of the axially movable dwell period selector may be displaced axially by a manually operated Bowden cable control through a bell crank lever. The output shaft of the transmission assembly is connected through suitable linkage to cause oscillation of the windshield wiper arms. When the clutch members on the output shaft and the worm wheel assembly are disengaged, the windshield wiper arms will rest in the parked position.

In FIG. 1 an automotive vehicle 10 is shown having a windshield 12 mounted thereon in a conventional manner. A windshield wiper motor 14 having a gear reduction assembly 16 is mounted on the fire wall 18 of the vehicle. The gear reduction assembly has a crankarm 20 operatively coupled thereto. An elongated link 22 is pivotally secured to the crankarm 20 through a second elongated link 24. Opposite ends of the link 22 are connected to crankarms 26 mounted at the inner ends of rockshafts or pivot shafts 27. The rockshafts 27 are journaled in the cowl of the vehicle and have wiper arms 28 mounted at their outer ends. The wiper arms each carry wipers 30. When the wiper motor 14 is energized, the wipers 30 will be oscillated across the windshield to clear moisture therefrom. The gear reducer 16, crankarms 20 and 26 and links 22 and 24 and the rockshafts constitute the wiper transmission means.

The circuit for energizing the wiper motor is shown in FIG. 7. The motor 14 includes an armature 32 connected in parallel with the field winding 34 which is connected in circuit with a battery 36 through a switch or contactor 38, armature 32 and field winding 34 to ground. Connected in parallel with the on-off switch 38 is a parking switch 40 actuated by rotation of the armature 32. When the on-off switch is closed, the circuit through the motor is as described above. Rotation of the armature 32 effects closing of the parking switch 40. Thus, when the on-off switch is subsequently opened, the motor will continue to operate through the following circuit. Current will flow from battery 36 through lead 42, and parking switch 40, lead 45 and lead 49 to the armature 32 and field winding 34 of the motor and thence to ground. When the motor reaches its parking position wherein the blades lie adjacent the lower windshield molding, the parking switch 40 opens. The physical construction of this parking switch will be described hereinafter in connection with the description of the gear reduction assembly 16 which includes the parking switch.

The gear reduction assembly 16 includes a housing 44 which may be cast integral with the end cap 46 of the motor or may be suitably secured thereto in any suitable manner. The gear reduction housing 44 includes a motor stub shaft housing portion 47 which communicates with the gear box portion 48 of the housing 44. An output shaft 50 is suitably mounted within the gear box 48 and is journaled for rotation adjacent its ends in sleeve bearings 52 and 54. Mounted concentrically with the output shaft 50 is a worm wheel assembly 53, which assembly is rotatable on the output shaft. The worm wheel assembly 53 includes a worm wheel 55 and a driving wheel 56 axially spaced from the worm wheel 55. The driving wheel 56 is secured at its hub portion to the hub portion of the worm wheel 55 whereby the worm wheel 55 and the driving wheel 56 are fixed for rotation with each other. An axially extending driving pin or lug 58 is mounted adjacent the periphery of the driving wheel 56 for a purpose to be hereinafter described.

The driving wheel 56 has a centrally disposed hub portion 57 on its lower surface as seen in FIGS. 2 and 5. Pivotally mounted thereon eccentrically is a clutch shoe 37 of arcuate configuration which is spring biased to swing outwardly of the periphery of the hub and which is coincident with the periphery of the hub in its innermost position. A second shoe, similar in construction and similarly mounted, but in opposition to the clutch shoe 37, is a backing shoe 39 which is biased outwardly in a direction opposite to the clutch shoe 37. A spring 41 disposed intermediate the free ends of the shoes 37 and 39 having its ends retained in recesses in the free ends of shoes 37 and 39 provides the biasing force. There is mounted on the output shaft 50 for rotation therewith adjacent the driving wheel 56, a driven wheel 43 of cup-shaped formation which receives within its upstanding walls the shoes 37 and 39. A lug 45 extending radially inward from the upstanding walls of the driven wheel 43 is provided for engagement with the clutch shoe 37 to provide a disconnectable driving engagement between the driving wheel 56 and the driven wheel 43. When the driving wheel 56 and the driven wheel 43 are in driving engagement, the shoe 39 serves to prevent backlash. Secured to the housing 44 adjacent the lower surface of the driven wheel 43, as seen in FIGS. 2 and 5, are a pair of contacts 31 and 33 which form part of the parking switch 40. These contacts are insulated from the housing 44. Secured to the lower surface of the driven wheel 43 and insulated therefrom is a conducting strip 35 engageable with contacts 31 and 33. This annular conducting strip 35 is broken at a selected point and maintains the motor circuit closed after the off-on switch 38 is opened until the wiper arms 28 reach the parked position.

An idler shaft 60 having its axis parallel to the axis of the output shaft 50 is rigidly mounted in the housing 44 in any suitable manner. One end is secured to the housing as, for example, by a nut 61 received on a threaded portion 63 which extends through an opening in the housing. The other end of the idler shaft 60 is free. Mounted for rotation thereon is a Geneva wheel unit 62 of a unique design. The Geneva wheel unit 62 includes a dwell period selector 64 and a Geneva wheel assembly 66. The Geneva wheel assembly 66 comprises a multi-lobed Geneva gear 68 and is shown as having six lobes 69 (FIG. 4). It includes an axially extending hollow hub portion 70. The hub portion 70 includes a section 72 adjacent its end remote from the Geneva gear 68 which is of smaller transverse dimension than a section 73 adjacent the Geneva gear 68. The inner periphery of the reduced diameter portion 72 is circular in cross section and is mounted for rotation on a reduced diameter portion 74 of the idler shaft 60. The reduced diameter portion 74 of the idler shaft 60 is located adjacent the end of the shaft 60 which is secured to the housing 44. The inner periphery of the larger section 73 of the hub 70 is polygonal in cross section and, as shown, is hexagonal. It is desirable to provide as many inner faces on the hub section 73 as there are lobes on the Geneva gear in order to provide a telescopic fit. The Geneva gear 68 has adjacent its lower face remote from the direction of axial extension of the hub portion 70 a plurality of slots 71, each one of which is located substantially centrally and extends radially on a lobe of the Geneva gear 68. Slidably received in the slots 71 are clutch actuating fingers 76 notched at their outer ends. A coil spring 78, or other suitable resilient member, circumscribes the Geneva gear 68 and is received in the notches at the outer ends of the clutch actuating fingers 76.

The dwell period selector 64 comprises a hollow cylindrical member having an inner periphery circular in cross section and an outer periphery polygonal in cross section. The dwell period selector 64 is disposed for axial and rotatable movement on the idler shaft 60 and is telescopically received for slidable movement within the enlarged hexagonal section 73 of hub 70. Radially extending cams 80a, 80b, 80c, 80d, and 80e are provided on respective faces of the outer periphery of the dwell period selector 64. In the example shown there are cam surfaces on five faces of the dwell period selector and one face is flat. It should be noted that cam surfaces may be disposed on any number of faces, depending on the ratio of wiper cycling to wiper dwell desired. The faces on the inner periphery of the hub section 73 include slots opening radially inward to receive the cam surfaces 80. The cam surfaces 80 are designed to engage the clutch actuating fingers for driving them outwardly beyond the periphery of the lobe with which they are associated. The cams on the various surfaces are of various dimensions so that as the dwell period selector is moved axially, different ones of the clutch actuating fingers are projected outwardly. The disposition of the cam surfaces on the dwell selector are most clearly shown in FIG. 9. The dwell period selector 64 includes an axially extending stem 82 of reduced diameter which extends through an opening 84 on the end of the housing 44 remote from the end of the housing to which the idler shaft 60 is secured.

A bracket 86 is secured to the gear reduction housing 44 upon which is mounted the linkage assembly for manual control of the dwell period selector 64. The linkage assembly includes a bell crank lever 88 pivotally mounted intermediate its ends by an ear 90 at pivot 92 on bracket 86. One end 94 of the bell crank lever 88 is bifurcated and engages a neck portion 96 on the axially extending stem 82 of dwell period selector 64. The other end 98 of the bell crank lever 88 engages an end of the movable wire 100 of a Bowden cable 102 and is movable therewith. The movable wire 100 of the Bowden cable 102 is slidable in a resilient casing 104 which is fixed by a clamping member 106 at one end on the bracket 86. The other end of the Bowden cable may be secured at the manual switch 108. It can thus be seen that movement of the manual control 108 effects axial movement of the dwell period selector 64 through a Bowden wire 100 and the bell crank lever 88. The Geneva gear 68 and the driving wheel 56 are disposed with their peripheries in juxtaposition so that the driving pin or lug 58 of the driving wheel 56 engages successive interstices 110 between pairs of lobes of the Geneva gear 68 and, for each revolution of the worm wheel 55, the Geneva gear 68 is indexed through a distance of one lobe. It will be apparent, then, that manual actuation of the Bowden wire 100 will effect axial movement of the dwell period selector 64 which in turn will cause engagement of certain of the cam surfaces 80 with the inner ends of the clutch actuating fingers 76, thereby moving the clutch actuating fingers 76 radially outward beyond the periphery of an associated lobe 69. When the Geneva wheel is positioned with a lobe 69 in juxtaposition with the clutch shoe 37, the clutch shoe 37 will be biased inwardly if that lobe of the Geneva gear has its associated clutch actuating finger 76 in extended position. Thus the actuating finger 76 will cause clutch 37 to disengage lug 45 on driven wheel 43. The output shaft 50 will then remain stationary. Thus no motion will be transmitted to the wipers 30 and this results in a dwell period. However, the driving wheel 56 will continue to rotate and the pin or lug 58 will advance the Geneva wheel unit to cause the next adjacent lug to lie in juxtaposition with the clutch shoe 37. If the said next adjacent lobe 69 of Geneva gear 68 has its associated clutch actuating finger in retracted position due to absence of engagement with the cam surface 80, the clutch shoe 37 will be biased outwardly and positioned to engage lug 45 of driven wheel 43, thereby effecting a rotation of the driven wheel 43 together with the output shaft 50. This will result in a cycle of wiper operation.

Figure 9:
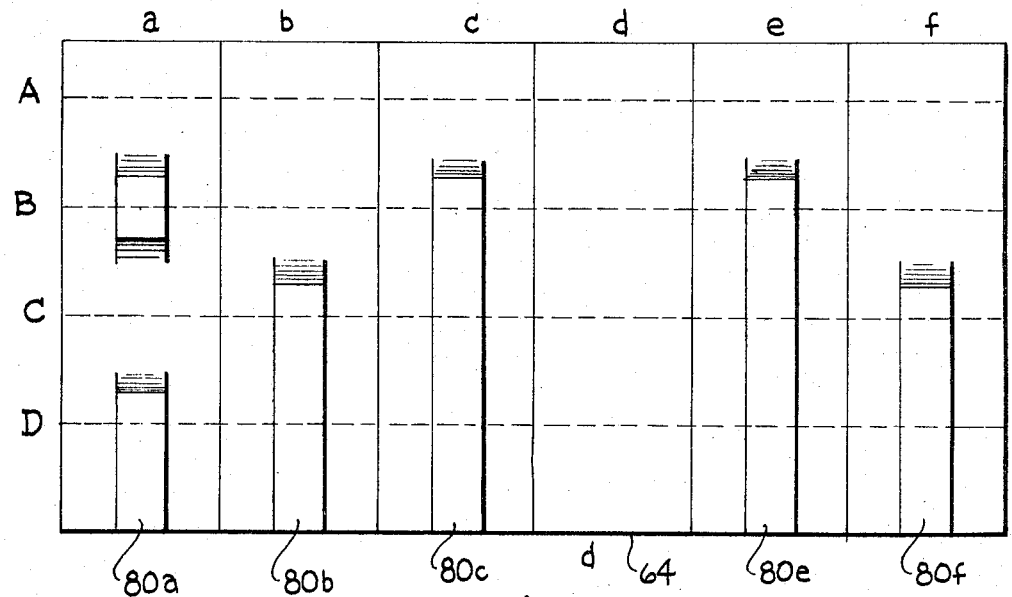
FIG. 9 is a schematic view showing the dwell period selector of FIG. 6 expanded.

The structure and scheme for varying the dwell period can best be understood by considering FIGS. 8 and 9. The lower case letters suffixing the reference numerals identify associated parts as, for example, the surface which includes cam 80a is associated with a lobe 69a and actuates the finger 76a. The surface having cam 80b thereon is associated with lobe 69b and the cam actuates clutch actuating finger 76b, etc. Capital letters A, B, C, and D represent various positions on the dwell period selector 64. The dwell period selector can be moved axially so that a selected one of positions A, B, C and D lies in the plane of the inner ends of the clutch actuating fingers 76. It can thus be seen that when the dwell period selector is moved axially so that position A is in alignment with the inner ends of the clutch actuating fingers 76, all of the clutch actuating fingers will remain in retracted position. When the dwell period selector 64 is moved so that position B lies in the plane of the clutch actuating fingers 76, the fingers 76a, 76c and 76e will be extended beyond the periphery of their associated lobe. With position C in the plane of the clutch actuating fingers 76, fingers 76b, 76c, 76e and 76f will be extended radially beyond the periphery of their associated lobes. When position D lies in the plane of the clutch actuating fingers 76, then clutch actuating fingers 76a, 76b, 76c, 76e, and 76f will be extended radially beyond the periphery of the corresponding lobes.

The operation of the windshield wiper system should now be apparent. When the switch 38 is moved to the "on" position, the motor rotates. Worm gear on the output shaft of motor 14 engages the worm wheel 55 and rotates it in a counterclockwise direction, as seen in FIG. 3. The driving wheel 56 rotates with the worm wheel 55 and the pin or lug 58 thereon engages consecutive interstices 110 to rotate the Geneva gear 68. With the dwell period selector 64 actuated to position A, as described above, none of the clutch actuating fingers 76 are in extended position. Therefore, the clutch shoe 37 continuously engages the lug 45, resulting in counterclockwise rotation of the driven wheel 43 together with the output shaft 50 to which the driven wheel is rigidly secured, as by splining as shown. This results in continuous oscillation of the wiper blades 30 through linkages 20, 22, 24 and 26. The manual control for the dwell period selector may be actuated to move dwell period selector 64 to a selected one of positions A, B, C or D through Bowden wire 102 of bell crank lever 88 to effect the projection of selected ones of the clutch actuating fingers 76. In position B, the projecting fingers will cause an intermittent dwell period between cycles of wiper operation in a ratio of one to one. In position C, the dwell period will occur between cycles of wiper operation at a ratio of two cycles of dwell periods to one cycle of wiper operation. In position D, the ratio will be five cycles of dwell periods to one cycle of wiper operation. A cycle of dwell period occurs when a lobe 69 of the Geneva gear having a projected finger 76 lies in opposition to the driven wheel 43. The projected finger 76 engages the clutch shoe 37 and biases it inwardly out of engagement with the lug 45, thus causing the driven wheel 43 to idle. This results in no rotation of the output shaft 50.

When it is desired to discontinue wiper operation, the switch 38 is moved to the "off" position, breaking the circuit from the battery through the switch 38 and motor to ground. However, if the wiper is in any position other than its parked position, the contact strip 35 will bridge contacts 31 and 33 maintaining a circuit from the battery through the "off" position of switch 38 through lead 42, contact 33, contact strip 35, contact 31, lead 45 and lead 49 through the field 34 and armature 32 of motor 14, respectively, to ground. When the wipers reach parked position, the open portion of contact strip 35 will overlie one of the contacts 31 or 33 and break the circuit, thereby effecting a discontinuance of motor operation.

Thus it can be seen that a unique windshield wiper motor construction for selectively providing operator variable intermittent dwell windshield wiper action or continuous windshield wiper action has been provided. In this construction, a relatively few additional parts have been added to produce this manually selectable variable dwell period operation. The system may be switched from continuous to intermittent operation without motor reversal and without electrical switching. Likewise, the dwell period may be varied to conform with variations in wetness of the road and with rainfall conditions. There is provided automatic parking and instantaneous starting of the wipers.

A certain specific embodiment of the invention has been described for the purpose of illustration, but it will be apparent that various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What is claimed is:

1. A windshield wiper power transmission assembly for converting rotary motion to intermittent rotary motion, having operator selectable dwell period durations and operator selectable continuous rotary motion output comprising a rotating wheel adapted to be driven by a source of rotary motion, an output shaft, a first clutch element fixed for rotation with said rotating wheel, a second clutch element engageable with said first clutch element fixed for rotation with said output shaft, clutch actuating means indexed by said rotating wheel for automatically effecting periodic disengagement of said first and second clutch elements and operator actuated, axially movable cam control means for selecting the duration of the period of disengagement of said first and second clutch elements.

2. A windshield wiper power transmission assembly for converting rotary motion to intermittent rotary motion, having operator selectable dwell period durations and including an operator selectable continuous rotary motion output comprising a rotating wheel adapted to be driven by a source of rotary motion, an output shaft, a movable clutch element and a fixed clutch element, one of said movable and fixed clutch elements being fixed for rotation with said rotating wheel, the other of said movable and fixed clutch elements being fixed for rotation with said output shaft, a clutch actuating unit including a gear movable relative to said rotatable wheel indexed in response to rotation of said rotating wheel, a plurality of clutch actuating elements disposed at spaced positions on said clutch actuating gear and movable relative to said clutch actuating gear from operative to inoperative positions, said clutch actuating elements being positioned to act on said movable clutch element when in operative position for automatically periodically effecting disengagement of said fixed and movable clutch elements and operator controlled means for moving selected ones of said clutch actuating elements to operative position.

3. A windshield wiper power transmission assembly for converting rotary motion to intermittent rotary motion, having operator selected dwell period durations including an operator selectable continuous rotary motion output comprising a rotating gear unit adapted to be engaged with a source of rotary motion, an output shaft, first and second clutch elements secured for rotation with said rotating gear unit and said output shaft, respectively, a multi-lobed Geneva gear, means on said rotating gear unit for indexing said Geneva gear, one of said first and second clutch elements being movable into and out of engagement with the other of said first and second clutch elements, each one of a plurality of lobes of said multi-lobed Geneva gear having an extendable member engageable with said one clutch element when extended to effect disengagement of said first and second clutch elements, and operator controlled means for effecting extension of selected ones of said extendable members.

4. A windshield wiper power transmission assembly for converting rotary motion to intermittent rotary motion, having operator selected dwell period durations including an operator selectable continuous rotary motion output comprising a rotating gear unit adapted to be engaged with a source of rotary motion, an output shaft, first and second clutch elements secured for rotation with said rotating gear unit and said output shaft, respectively, a multi-lobed Geneva gear, means on said rotating gear unit for indexing said Geneva gear, one of said first and second clutch elements being movable into and out of engagement with the other of said first and second clutch elements, each one of a plurality of lobes of said multi-lobed Geneva gear having a radially extendable member engageable with said one clutch element when extended to effect disengagement of said first and second clutch elements, an operator controlled movable member having a plurality of cam surfaces, said movable member being axially movable relative to said Geneva gear, each of said cam surfaces being engageable with one of said extendable members to effect extension thereof when a selected cam surface is in a selected axial position relative to said Geneva gear.

5. A windshield wiper power transmission assembly for converting rotary motion to intermittent rotary motion, having operator selected dwell period durations including an operator selectable continuous rotary motion output comprising a rotating gear unit adapted to be engaged with a source of rotary motion, an output shaft, first and second clutch elements secured for rotation with said rotating gear unit and said output shaft, respectively, a Geneva gear unit including a multi-lobed Geneva gear having a hub portion polygonal in cross section, means on said rotating gear unit for indexing said Geneva gear, one of said first and second clutch elements being movable into and out of engagement with the other of said first and second clutch elements, one or more of a plurality of lobes of said multi-lobed Geneva gear having a radially disposed, radially extendable finger engageable with said one clutch element when extended to effect disengagement of said first and second clutch elements, an operator controlled dwell selector polygonal in cross section, axially movable in said hub portion of said Geneva gear, said dwell selector having diversely disposed cam surfaces on one or more sides, each of said cam surfaces being engageable with a radially extendable finger when in a selected axial position relative to said Geneva gear to effect extension of the engaged finger whereby a dwell period is produced when the Geneva gear is indexed to a position where an extended finger engages said one clutch element.

References Cited by the Examiner
UNITED STATES PATENTS

| | | | |
|---|---|---|---|
| 3,039,323 | 6/1962 | Mori | 74—568 |
| 3,118,164 | 1/1964 | Deibel et al. | 74—125.5 X |
| 3,194,086 | 7/1965 | Laschenski | 74—568 |

FRED C. MATTERN, Jr., *Primary Examiner.*

BROUGHTON G. DURHAM, *Examiner.*

J. A. MARSHALL, D. H. THIEL, *Assistant Examiners.*